July 16, 1935.　　　R. J. C. TAMPIER　　　2,008,050
BALL JOINT
Filed March 17, 1933　　　3 Sheets-Sheet 1
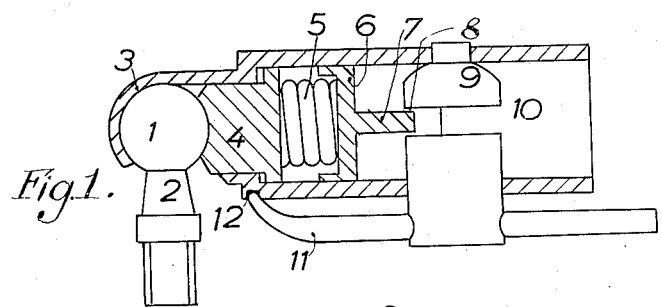
Fig.1.
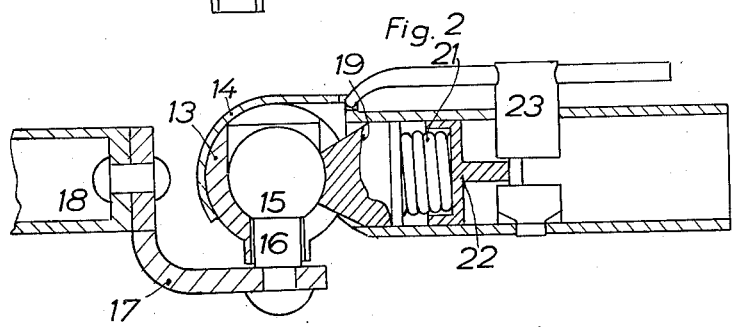
Fig.2.
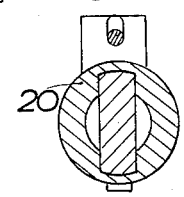
Fig.4.
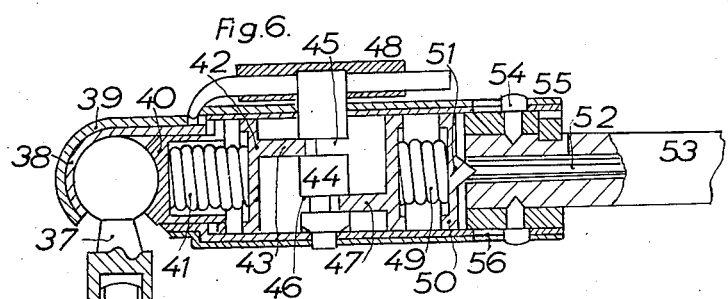
Fig.6.
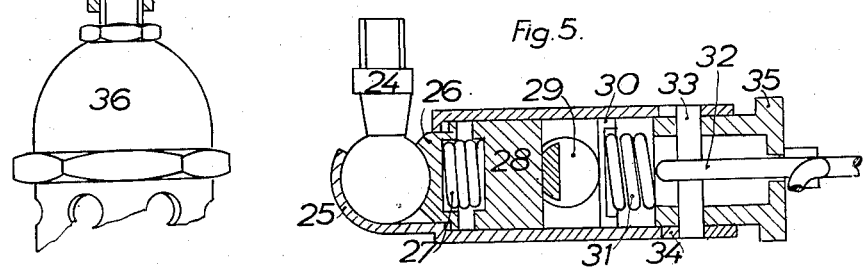
Fig.5.
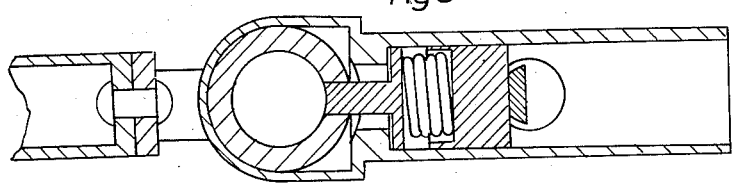
Fig.3.
INVENTOR:
René J. C. Tampier
BY
ATTORNEY July 16, 1935.  R. J. C. TAMPIER  2,008,050
BALL JOINT
Filed March 17, 1933   3 Sheets-Sheet 2
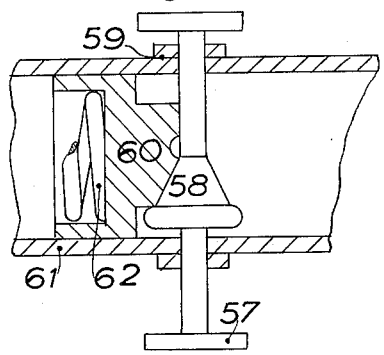
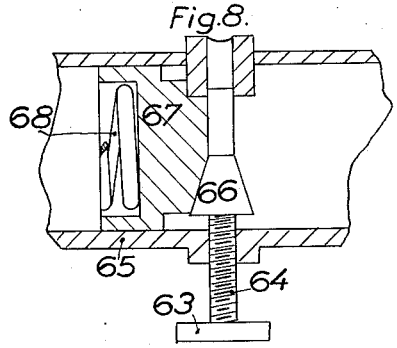
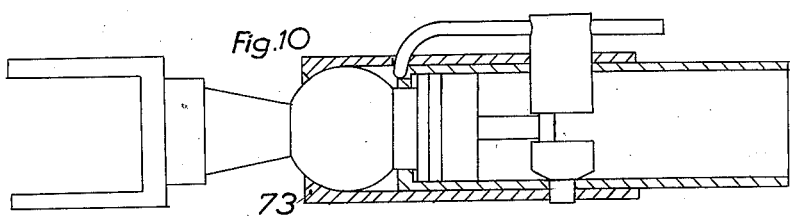
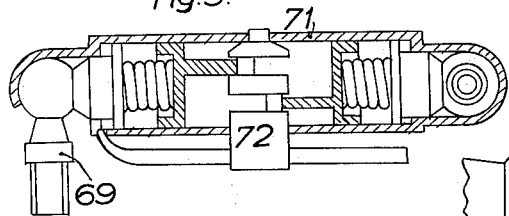
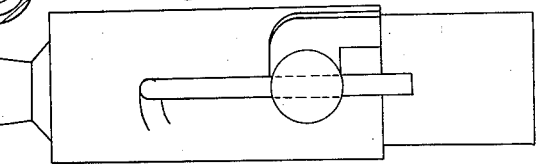
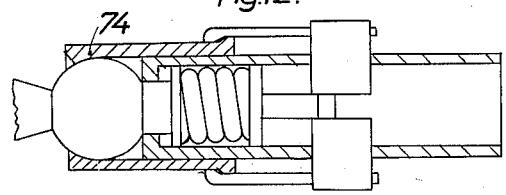
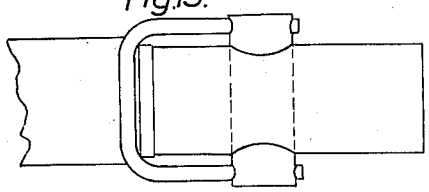
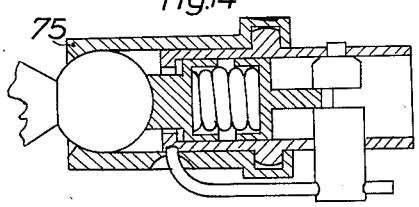
INVENTOR:
René J. C. Tampier
BY
ATTORNEY July 16, 1935. R. J. C. TAMPIER 2,008,050
BALL JOINT
Filed March 17, 1933   3 Sheets-Sheet 3
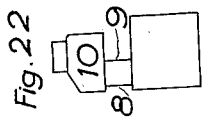
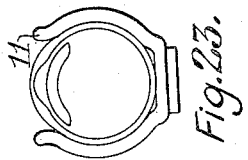
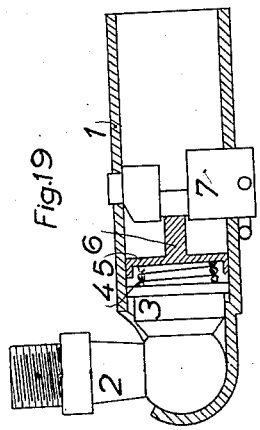
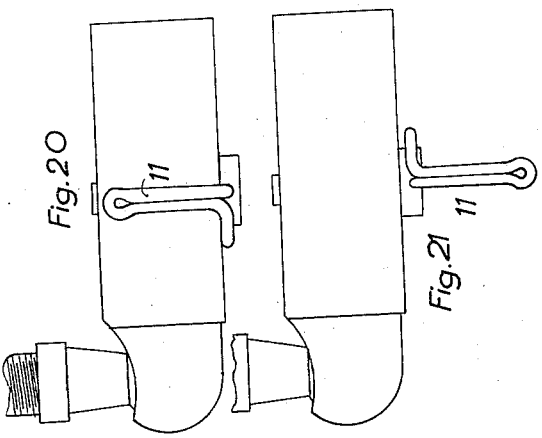
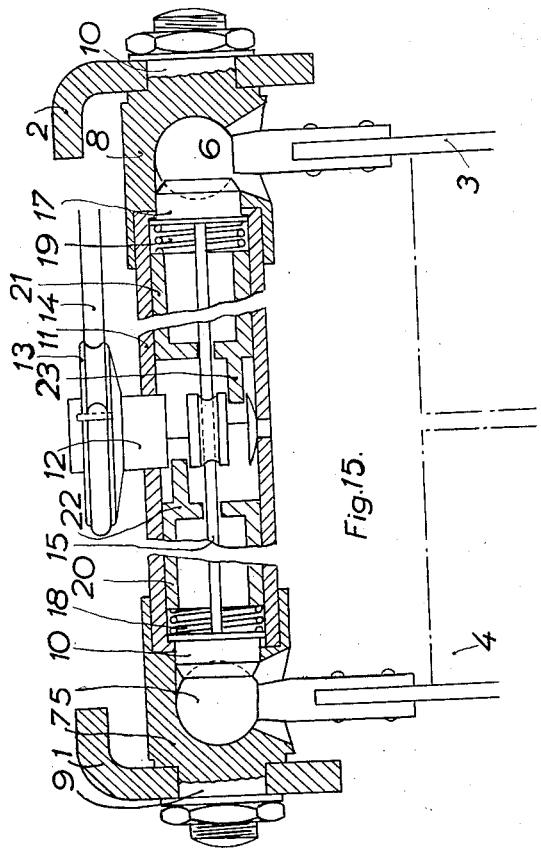
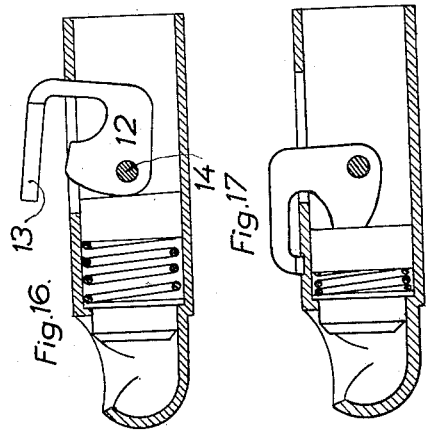
INVENTOR:
René J. C. Tampier
BY
ATTORNEY Patented July 16, 1935

2,008,050

UNITED STATES PATENT OFFICE 2,008,050

BALL JOINT

René Jean Camille Tampier, Boulogne-sur-Seine, France

Application March 17, 1933, Serial No. 661,395
In France March 19, 1932

5 Claims. (Cl. 287—90)

In the case of aircraft, as in that of motor vehicles, endeavours are being made to obtain rapid disconnection of joints, for example in dismounting engines which it is desired to replace quickly. The method of reattachment should be such that no untimely loosening can occur, and that all play is taken up while the device is in use.

In order to attain this result, use has been made of a ball joint, in which any possible play is taken up by a spring, the tension of which can be raised to the maximum, without the possibility of the device coming undone, by means of a cam perpendicular to the axis of the ball which is adapted to turn or slide in that position.

The invention relates more particularly to constructions in which the axis of the ball rod, when in its mean position, is at right angles to the direction of the thrust or pull that is to be produced. It is applicable in particular to the controls of carbureters, to levers in which the ball rod is overhung or is integral with the control lever; to torsional controls; in the terminals for attaching control wires or those of sparking plugs. It is also applicable to cases where the ball rod is disposed in the direction of the thrust or pull that is to be produced.

The invention consists in the provision of means for taking up all play in the joint while in use and in the combination therewith of means for enabling the joint to be rapidly connected and disconnected.

In the accompanying drawings which illustrate various embodiments or applications of this invention:—

Figure 1 represents a section of this joint in the case of an ordinary control operating by thrust or traction;

Figure 2 is a section of this joint in the case of a torsional control;

Figure 3 is a section on line a—a of Figure 2;

Figure 4 is a section on line b—b of Figure 2;

Figure 5 is a section of the device as applied for attaching the rudder control wire on aircraft;

Figure 6 is a section of the device as applied for attaching a sparking plug wire;

Figure 7 is a modification in which the locking device is in the form of a sliding member;

Figure 8 represents a locking device of the screw-down type;

Figure 9 represents two ball rods which can be locked by means of a single key;

Figure 10 represents a joint in which the ball rod may be in alignment with the axis of the casing;

Figure 11 is a plan of Figure 10;

Figure 12 is a section of a further modification;

Figure 13 is a plan of Figure 12;

Figure 14 is a section of another modification.

Figure 15 is a view in sectional elevation of the invention as applied to means for mounting an aircraft tank;

Figures 16 to 19 illustrate a similar device to that shown in Figure 1 with a modified form of key locking means, and, Figures 20 to 23 illustrate a similar device with a modified form of combined key and locking means.

1 is a ball with the attached rod 2 and adapted to move in all directions in the ball socket 3. Against the ball 1 bears the spherical thrust block 4 actuated by the spring 5 engaging in the block 6 having a diametrical ridge 7 which fits into a groove 8 in the key 9 and bears against one face of a cam element $9^\times$; the key 9 is also provided with a second groove 10 against which the ridge 7 is adapted to bear when the key 9 is in the reverse position. A flat surface is provided on each face of the cam. The key 9 is actuated by a tommy bar 11, one end of which engages with a recess 12 provided in the member 3.

In Figures 2, 3 and 4, 13 represents a hollow ball, provided with a gap and bore, which moves in the ball socket 14 and houses a second ball 15 which is integral with the stud 16 of the support 17 and of the rotatable tube 18. The block 19, the upper and lower extremities of which engage in a groove 20 (Figure 4) of the member 14, is pushed by a spring 21, the block 22 and cam 23 of the key $23^\times$ (shown in section in Figure 3).

In Figure 5, 24 is a ball rod which moves in its housing 25 and is pushed by a block 26 compressed by the spring 27 and the block 28 which is under the action of the cam 29 of the key $29^\times$. A washer 30 serves as the abutment for a spring 31 which bears against a socket 35 carrying a rod 33 about which the wire 32 is coiled. This rod is adapted to move in the bayonet-catch groove 34 in the casing 25. The socket 35 serves to limit the coiling of the wire.

In Figure 6, 36 represents a sparking plug on which is secured a ball rod 37 moving in the ball socket 38 surrounded by the insulating sheathing 39. The block 40 is pressed by the spring 41. The block 42 has an eccentric ridge 43 engaging in a groove 45 and bears against one face of the cam $45^\times$ of the key 44. This key has a second groove 46 and cam $46^\times$ engaging the ridge 47 of the block 48, symmetrically disposed in relation to the first named ridge. The block 48 forms the abutment of a spring 49 which presses against the block 50, provided with a point 51 which makes contact with the metal portion 52 of the insulated cable 53. Pins 54, passing through the metal member 55 gripping the end of the wire, are provided with a projecting head adapted to move in the bayonet catch slots 56 provided in the member 38. The bar 44× for actuating the key 44 is insulated.

In Figure 7, 57 represents the handle of a key 58 provided with a tapered cam surface 58× which key slides in the guides 59 and the cam 58× exerts a thrust on the block 60 which slides in the casing 61 and compresses the spring 62.

In Figure 8 the key 63 provided with the conical cam surface 66 has a threaded stem 64 which when screwed into the casing 65 causes the cam 66 to exert a thrust on the block 67 against the action of the spring 68.

In Figure 9 are shown two ball joints 69 and 70 disposed at right angles and mounted in a casing 71. The double-action key 72 and interposed parts act on the balls in a similar manner to that described with reference to Figure 6.

In Figures 10 and 11 a detachable cap 73 is retained on the casing 74 by a bayonet slot 75 in the cap engaging with the ends of the key 76 which is similar in formation and operation to the key 9 in Figure 1.

In Figures 12 and 13, the detachable cap 77 is retained on the casing 78 by means of a bent wire 79, the ends of which are secured to the outer ends of the key 80.

In Figure 14 the casing 81 is provided with projections 82 adapted to engage with the groove 83 on the end of the detachable cap 84 in the manner of a bayonet joint, the key 84× and associated parts being constructed and operating in a similar manner to the constructions above described.

In Figure 15, 85 and 86 represent the longérons of the fuselage of an airplane and 87 are the straps supporting the tank 88. These straps are attached to the balls 89 and 90 which engage in the two casings 91 and 92 formed integral with the members 93 and 94 by means of which the joint device is suitably secured on the longérons 85 and 86.

Inserted in the casings 91 and 92 is a tube 95 through which passes the cranked key 96 controlled by the pulley 97 and cable 98. Said key, at the same time, controls the winding of a cable 99 adapted to draw together the blocks 100 and 101 pushed by the springs 102 and 103 which push back the tubes 104 and 105 terminated by members provided with the ridges 106 and 107 engaging in the corresponding recesses 108 and 109 provided in the key 96 and bearing against the cams 110 and 111 in said recesses.

It will be seen that, on the key 96 being turned, the tubes 104 and 105 diverge or converge. When it is desired to detach the tank, the cable 98 is actuated in such a manner that the tubes 104 and 105 converge, releasing the springs 102 and 103. At the same time in winding on the key, the cable 99 allows the blocks 100 and 101 to release the balls 89 and 90 completely, the weight of the tank 88 then drawing said balls out of their casings.

In the case, for example, of detaching a wing tank, these balls may be employed simultaneously, a single control releasing them all.

The cranked key may, if desired, be replaced by a threaded taper member adapted to turn several times on itself, thereby lessening the effort required for effecting the detachment.

In the examples of construction illustrated in Figures 16 to 19, the main parts of the joint are similar to the left hand half of Figure 9, but in these figures the face 112 of the cam 113 of the key 114 is cylindrical while the faces 115 of the cam and the face 116 of the key are flat and the key handle 117 is formed of steel wire arranged to clip round the casing 118 and thereby hold the key and associated parts in the locking position, but when the handle 117 is sprung free from the casing as shown in Figure 19, it may be used to turn the key 114 into and out of the locking position.

It will be obvious that the flat 116 enables the key to be mounted without fully compressing the spring 119 and that the rounded portion 112 of the cam 113 on the other hand enables the key said spring to be completely locked on the key 113 being turned through 180°. Thus, by varying the dimensions of the members any desired play can be given to the ball.

In the construction shown in Figures 20 to 22, the rotatable key is replaced by a flat key 120 provided with a cam surface 121 adapted to bear against the sliding block 122 and with two branch members such as 123 adapted to clip round the casing 124, said key being pivotally mounted on a pin 125 fixed in said casing. In use, to release the ball from the casing the key 120 is raised into the position shown in Figure 20, whereas to lock the ball to the casing said key is forced into the position shown in Figure 21, the branches 123 thereby embracing the casing preventing any tendency for the key to turn on its pivot into the unlocking pin inadvertently.

It will be understood that the invention is not limited to the details or combination of parts as illustrated as other combinations and arrangements may be devised according to the use to which the joint is to be put, without departing from the essential characteristics of this invention.

It will be noted that not any of the components of the devices herein described, with the exception of the screw 64 in Figure 8, are provided with screw threads, as the metal employed, usually an alloy of aluminium, wears away too quickly in the threaded portions.

The operation of the several constructions of joints illustrated will be readily understood as it will be evident that when the keys 9, 23×, 29×, 45, 72, 76, 80, 84×, 96 and 114 are turned so as to bring the deeper recess opposite the ball end of the joint, the springs will be decompressed, and that when the conical cam surfaces 58× and 66 are in the positions shown in Figures 7, 8 and the plate key 120 is in the position shown in Figure 20, the same conditions will exist.

Having now particularly described and ascertained the nature of my said invention and in what manner the same is to be performed, I declare that what I claim is:—

1. A ball joint coupling device comprising a casing having a ball seat formed therein, a ball-retaining member slidably mounted in said casing adapted to engage a ball for retaining the ball on the ball seat, a spring associated with the ball retainer for urging said retainer into operative position, a spring follower associated with the spring, and eccentric means engaging the spring follower for shifting the follower toward the ball seat to place said spring under pressure and for shifting the follower away from the ball seat to relieve the pressure of the spring on the ball-retaining member, said eccentric means having a cam surface for engaging the spring follower, a portion of which is flattened to retain the eccentric in adjusted positions.

2. A ball joint device comprising a casing having a ball seat, a ball-carrying member having its ball positioned on the seat, a ball-retaining member slidably mounted in said casing toward and away from said ball seat, a spring for urging said ball-retaining member toward said seat, a spring follower associated with one end of the spring, a rotatable member having a cam surface for shifting said spring follower to increase the pressure exerted by the spring on said ball retainer, a handle for rotating said member, and spring means associated therewith for embracing and grasping said casing to hold the handle in an adjusted position.

3. A ball joint device comprising a casing having a ball seat, a ball-carrying member having its ball positioned on the seat, a ball-retaining member slidably mounted in said casing toward and away from said ball seat, a spring for urging said ball-retaining member toward said seat, a spring follower associated with one end of the spring, a spring follower shifting member comprising a rotatable cylindrical body having a slot formed therein perpendicular to the axis thereof and extending from the surface to a point beyond the axis of the cylindrical member, said member also having a similar but very shallow slot positioned diametrically of the aforesaid slot to form between said slots a flattened eccentric pin, and means carried by said spring follower for entering the slots formed in said rotatable member and engaging said flattened eccentric pin.

4. A ball joint device comprising a casing having a ball seat, a ball-carrying member having its ball positioned on the seat, a ball-retaining member slidably mounted in said casing toward and away from said ball seat, a spring for urging said ball-retaining member toward said seat, a spring follower associated with one end of the spring, a spring follower shifting member comprising a rotatable cylindrical body having a slot formed therein perpendicular to the axis thereof and extending from the surface to a point beyond the axis of the cylindrical member, said member also having a similar but very shallow slot positioned diametrically of the aforesaid slot to form between said slots a flattened eccentric pin, means carried by said spring follower for entering the slots formed in said rotatable member and engaging said flattened eccentric pin, and means for rotating said cylindrical body including a handle provided with a spring clasp for retaining the same in an adjusted position.

5. A ball joint coupling device comprising a casing having a ball seat formed therein, a ball-retaining member slidably mounted in said casing adapted to engage a ball for retaining the ball on the ball seat, a spring associated with the ball retainer for urging said retainer into operative position, a spring follower associated with the spring, eccentric means engaging the spring follower for shifting the follower toward the ball seat to place said spring under pressure and for shifting the follower away from the ball seat to relieve the pressure of the spring on the ball-retaining member, and an eccentric actuating device including spring means adapted to embrace said casing for locking said eccentric means in ball-retaining position.

RENÉ JEAN CAMILLE TAMPIER.